United States Patent Office 2,822,068
Patented Feb. 4, 1958

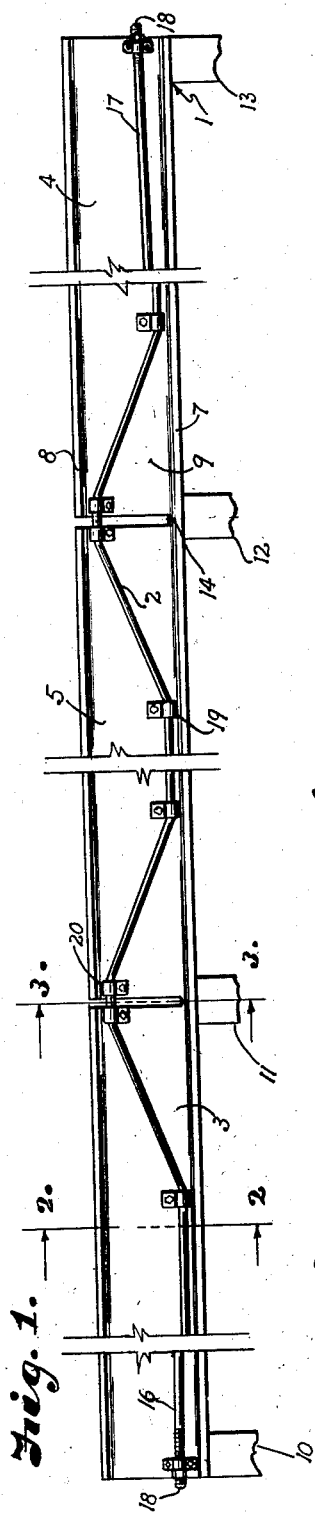
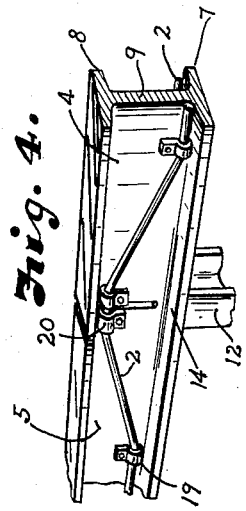
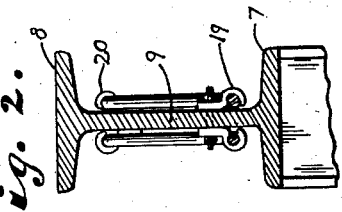
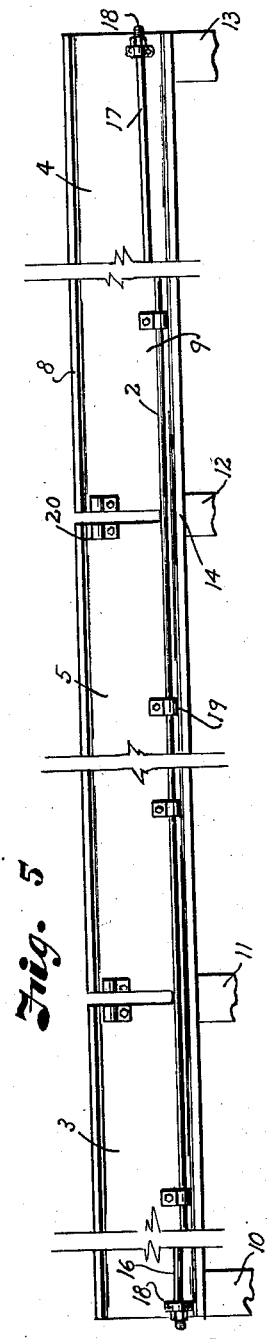

2,822,068

BEAM STRUCTURES AND METHOD OF APPLYING TENSION THERETO TO REVERSE THE STRESS THEREIN

Hubert Lee Hendrix, Tulsa, Okla.

Application March 18, 1953, Serial No. 343,031

3 Claims. (Cl. 189—37)

This invention relates to structural members, and more particularly to load supporting beams such as are used in the spans of bridges, buildings and other structures and the method of applying tension to such beams to reverse the stress therein.

In ordinary beam spans wherein the ends are supported and a load applied to the beam intermediate the supports, the lower portion of the beam is in tension and the upper portion of the beam in compression. In designing the structure the possible loads and resulting stresses in the beam are calculated, then by allowing for a suitable safety factor the beam structure is selected to safely support the calculated possible load. In some old structures, for example bridges, modern loads are in excess of those used in making the calculations for the design of the bridge. It is desirable to avoid replacement of such bridge structures where possible by increasing the load carrying ability of same without changing the clearance below the bridge structure. Also, in new structures it is desirable to support the maximum load with a minimum of material.

The objects of the invention are to provide a method of applying tension to beam structures to reverse the stresses therein for either reducing the quantity of material required or for lowering the stresses in the structure; to provide tension members on beam spans within the height of the beam member with portions of said tension members below the neutral axis of the beam members to reverse or lower the stress in the portion of the beam usually in tension and increase the load carrying capacity thereof; to provide a tension rod on each side of a beam structure with the ends fixed adjacent the ends of the structure and brackets on the beam having sliding engagement with the rods intermediate the ends of the beam to position the rod and application of the force therefrom to the beam; to provide such a structure wherein a plurality of beam spans are arranged with the lower portions of the beam ends connected and the upper portions of the beam ends disconnected and tension rods slidingly held adjacent the lower portion or below the neutral axis of the beam intermediate the beam ends and slidingly held adjacent the upper portion of the beam at the beam ends; to provide a method of stressing a beam span wherein rods are slidingly supported intermediate the ends of the beams and connected to the ends of the beam span and then applying upward bending force to the rods at the intermediate beam ends to vary the alignment of the rod from a straight line and attain desired tension thereon and then slidingly supporting the bent portions of the rods adjacent the upper portions of the beams; and to provide an application of tension members to beams that is economical to install, efficient in operation to permit usual beam loading with less material or a lowering of the usual stress and capable of carrying compression through a plurality of beam spans without connection of the beam ends at the upper portions thereof wherein the lower portions of the beam ends are connected to transfer imposed compression from end spans to the interior spans of the structure.

In accomplishing these and other objects of the present invention, I have provided improved details of structure, the preferred form of which is illustrated in the accompanying drawings, wherein:

Fig. 1 is a beam structure having a plurality of beam spans with tension members applied thereto in accordance with the present invention.

Fig. 2 is a transverse sectional view through the span on the line 2—2, Fig. 1.

Fig. 3 is a transverse sectional view through the beam span on the line 3—3, Fig. 1.

Fig. 4 is a perspective view of a portion of a beam and tension members supported thereon.

Fig. 5 is a side elevation of the structure having a plurality of beam spans with a tension rod arranged thereon prior to the application of tension to the rod.

Referring more in detail to the drawings:

1 designates a load supporting beam structure provided with tension members 2 in accordance with the present invention. The arrangement of the tension members on beams is applicable to bridges, buildings and other structures and is also applicable to beam structures of any type of material. The illustrated form is exemplary only and consists of a structure having a plurality of steel beam spans wherein the end spans are designated 3 and 4 respectively and the intermediate span 5. Each of the steel beams has bottom flanges 7 and top flanges 8 with a vertical web 9 connecting said flanges. Piers or other suitable supports 10, 11, 12 and 13 are arranged under the beam spans to support the ends thereof, the pier 10 being under the outer end of the beam 3, the pier 11 being under the adjacent ends of the beams 3 and 5, the pier 12 being under the adjacent ends of the beams 4 and 5, and the pier 13 being under the outer end of the beam 4. The beams are connected to the piers or supports in a conventional manner. The adjacent ends of the beams are connected as at 14 at the bottom flange but the webs and top flanges are disconnected as at 15.

The tension members 2 extend longitudinally of the beam spans and are arranged on each side of the beams below the neutral axis thereof. The ends 16 and 17 of the tension members, preferably in the form of steel tension rods, are anchored as at 18 to the beam spans 3 and 4 adjacent the respective outer ends thereof, the tension members being in a straight line as illustrated in Fig. 5. Saddle brackets or other suitable connectors 19 are mounted on the webs 9 in spaced relation, said saddle brackets being spaced from the ends of the beam spans. For example, the spacing between the saddle brackets 19 and the adjacent end of the beam span may be approximately one-fourth of the length of the span. With one end of the tension members anchored, tension force can be applied to the other end of said tension members to provide the desired stress thereon and then said other end anchored to the respective beam.

The tension on the tension members may also be attained by varying the alignment of the tension members or rods from a straight line a sufficient amount to obtain the desired stress. For example, suitable jacks may be arranged under the rods at the piers 11 and 12 and the jacks extended to bend the rods upwardly until sufficient tension is applied to the rods. Suitable saddle brackets 20 are then applied adjacent to the uppermost portion of the bent section of the rods to connect same to the webs of the beam spans. The saddle brackets 19 and 20 preferably have sliding engagement with the tension members or rods 2 but retain the portion of the rods in position relative to the neutral axis of the beam spans.

The tension on the tension members or rods 2 applies compression force to the beam spans on the tension side of the neutral axis thereof, lowering the tension applied to that portion of the beam spans by the loading on said spans or reversing the stresses whereby the portion of the beam below the neutral axis is in compression. This arrangement differs from what is termed continuous beam spans which have been criticized by some engineers. The longitudinal thrust at the bottom flange at the supports or piers is similar to that on a continuous beam, however, the thrust on the beam spans is due to an applied external force, namely the tension on the tension members or rods 2, whereas in a continuous beam span the thrust is due to deflection. Therefore, with the longitudinal thrust applied adjacent the bottom flange by the tension members 2, the thrust remains substantially constant after a considerable settlement of a support or pier when such settlement would cause a reversal of thrust on a continuous beam span. The reversal of stress in the beam spans by the tension members 2 is applied during the process of erection and then is maintained as there is a tendency for the stress imposed by live loads to be balanced by plastic flow. Also with the arrangement of the tension members 2, as illustrated in Fig. 1, both the bending moment and horizontal shear are reversed, thereby reducing the diagonal tension. The tension members 2 also carry part of the shear where they are bent up at the piers or supports.

It is to be noted that in the illustrated structure the tension members are within the height of the beam. This is especially advantageous where such an arrangement is to be used to reinforce old structures as the allowable live loading can be increased without disruption of traffic and without any remodeling of the structure except the addition of the tension rods and saddle brackets connecting the rods to the beams. Also such structures can be so strengthened without encroaching on or reducing the clearance under the structure, while on new structures the arrangement of the tension members on the beam spans can be used to effect a very definite saving of material and also allow the adoption of longer spans for the same section.

While the tension members are shown arranged on a structural member having top and bottom flanges, it can also be used on beams of various sections, for example box sections as well as those having unbalanced sections such as T beams. They also may be applied in the same manner to beams of concrete or other material.

It is believed obvious I have provided a method of reversing the stresses in structural members and an arrangement of tension members thereon which is economical to install and capable of being used to reduce the quantity of material required for supporting a given load or of lowering the stresses imposed on a structure by such load.

What I claim and desire to secure by Letters Patent is:

1. A load supporting multiple beam span structure comprising, a plurality of beam members arranged end to end and having spaced top and bottom flanges connected by webs, said beam structure being adapted to be supported at the ends of the bottom flanges of the respective beam members whereby loading of the beam structure imposes tension stress on one side of the neutral axis of the beam members and compression stress on the other side of the neutral axis of said beam members between the ends thereof, the adjacent ends of the beam members being connected below the neutral axis and disconnected above the neutral axis, tension members arranged longitudinally along the webs of the beam members below the neutral axis thereof, means on the beams in spaced relation to the ends of the beam members slidably supporting the tension members on said beam members, and means securing the ends of the tension members adjacent the ends of the beam structure to retain the tension in said tension members.

2. A load supporting multiple beam span structure comprising, a plurality of beam members arranged end to end and having spaced top and bottom flanges connected by webs, said beam structure being adapted to be supported at the ends of the bottom flanges of the respective beam members whereby loading of the beam structure imposes tension stress on one side of the neutral axis of the beam members and compression stress on the other side of the neutral axis of said beam members between the ends thereof, the adjacent ends of the beam members being disconnected above the neutral axis and connected below the neutral axis, tension members arranged longitudinally along the beam members below the neutral axis thereof, means on the beams in spaced relation to the ends of the beam members slidably supporting the tension members on said beam members, means securing the ends of the tension members adjacent the ends of the beam structure, said tension members being bent toward the top flange of the beams at the ends of the intermediate beam members to apply tension stress in the tension members, and means secured to the beam members and engaging the tension members at the bent portion thereof to retain the tension in said tension members.

3. A load supporting multiple beam span structure comprising, a plurality of beam members arranged end to end and having spaced top and bottom flanges connected by webs, said beam structure being adapted to be supported at the ends of the bottom flanges of the respective beam members whereby loading of the beam structure imposes tension stress on one side of the neutral axis of the beam members and compression stress on the other side of the neutral axis of said beam members between the ends thereof, the adjacent ends of the beam members being connected at the bottom flanges and the webs and top flanges disconnected, tension members substantially coextensive with the beam structure arranged longitudinally in a substantially straight line along each side of the beam members on the tension side of the neutral axis thereof, means on the beam webs in spaced relation to the ends of the beam members slidably supporting the tension members on said beam members, means securing the ends of the tension members adjacent the ends of the beam structure, the portions of said tension members at the adjacent ends of the respective beam members being bent to a position above the neutral axis of the beams at the ends of the intermediate beam members to apply tension stress in the tension members, and means secured to the beam members and slidably engaging the tension members at the bent portion thereof to retain the tension in said tension members whereby said tension members impose a force on the beam structure reducing the tension stress therein below the neutral axis and reversing the bending moment and horizontal shear in said beam structure.

References Cited in the file of this patent

UNITED STATES PATENTS

| | | |
|---|---|---|
| 435,155 | Schmemann | Aug. 26, 1890 |
| 468,841 | Stephenson | Feb. 16, 1892 |
| 865,488 | Graham | Sept. 10, 1907 |
| 1,594,505 | Frye | Aug. 3, 1926 |
| 2,579,183 | Freyssinet | Dec. 18, 1951 |